US005251017A

United States Patent [19]

Riviere

[11] Patent Number: 5,251,017

[45] Date of Patent: Oct. 5, 1993

[54] GAMMA CORRECTION CIRCUIT FOR AN ANALOG VIDEO SIGNAL

[75] Inventor: Marc Riviere, Chante Pie, France

[73] Assignee: France Telecom (Centre National d'Etudes des Telecommunications), Issy les Moulineaux, France

[21] Appl. No.: 721,385

[22] Filed: Jun. 26, 1991

[30] Foreign Application Priority Data

Jul. 6, 1990 [FR] France .............................. 90 08618

[51] Int. Cl.[5] .............................................. H04N 9/69

[52] U.S. Cl. ...................................... 358/32; 358/164; 358/455

[58] Field of Search .......................... 358/32, 164, 455

[56] References Cited

U.S. PATENT DOCUMENTS

| | | | |
|---|---|---|---|
| 3,697,857 | 10/1972 | El-Banna | 455/127 |
| 4,568,978 | 2/1984 | Cosh | 358/164 |
| 4,736,244 | 4/1988 | Shiota et al. | 358/76 |
| 4,794,622 | 12/1988 | Isaacman et al. | 455/119 |
| 4,829,381 | 5/1989 | Song et al. | 358/168 |

FOREIGN PATENT DOCUMENTS

| | | |
|---|---|---|
| 0116398 | 1/1984 | European Pat. Off. . |
| 3341667 | 11/1983 | Fed. Rep. of Germany . |

OTHER PUBLICATIONS

French Search Report for French Application 90 08618 filed Jul. 6, 1990.

*Primary Examiner*—Richard Hjerpe
*Assistant Examiner*—Minsun Oh
*Attorney, Agent, or Firm*—Nixon & Vanderhye

[57] ABSTRACT

A video path receives the signal to be processed and a reference path receives a reference voltage, with both paths subjecting their respective signals to logarithmic amplification having the same characteristics. These two paths are combined in a summing circuit giving gains respectively of gamma and of one minus gamma. The output from the summing circuit is applied to an exponential amplifier which is followed by a buffer to provide the corrected output signal. By an appropriate adjustment of resistances in the summing stage and also by means of switching, it is possible to perform gamma correction over the range about 0.2 to about 5, and it is possible to perform such correction on very wideband analog signals.

12 Claims, 1 Drawing Sheet

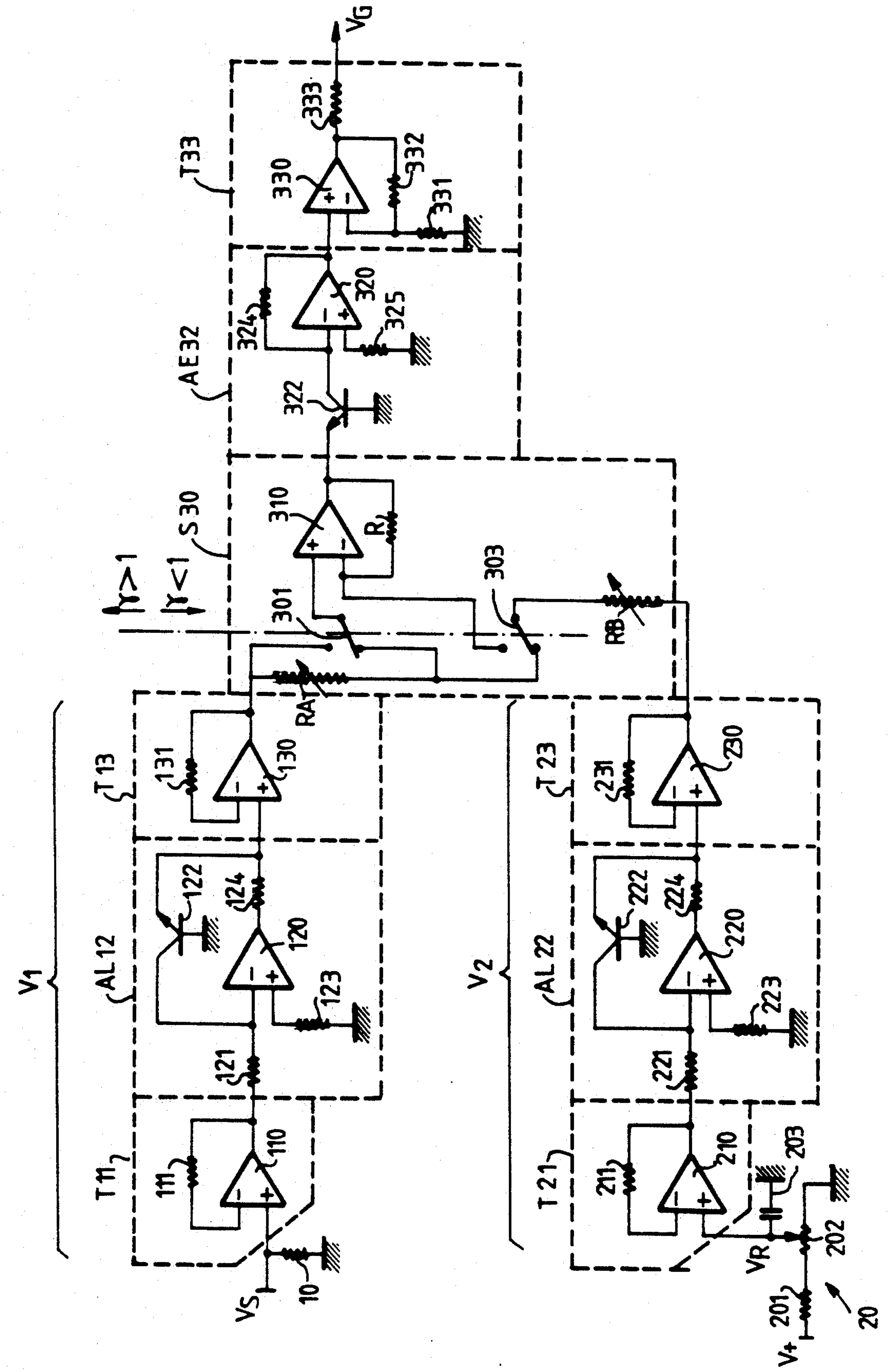
VG
T33
333
332
330
331
AE32
324
320
325
322
S30
310
R
γ>1
γ<1
301
303
RB
RA
V1
T13
131
130
AL12
122
124
120
123
121
T11
111
110
VS
10
V2
T23
231
230
AL22
222
224
220
223
221
T21
211
210
203
VR
202
201
V+
20

GAMMA CORRECTION CIRCUIT FOR AN ANALOG VIDEO SIGNAL

BACKGROUND OF THE INVENTION

1. Field of the Invention

The invention relates to gamma correction for a video signal.

2. Discussion of Prior Art

The luminance of an image point on a cathode ray tube (CRT) is not proportional to the voltage applied to the tube at the same moment. On the contrary, luminance is a power function of said voltage. It is conventional to call the value of the exponent of said power function "gamma".

Various factors cause the value of gamma to lie in the range a little more than 0 to about 5. However, this is a design choice, and the value remains constant for a given device.

There are various proposals in existence for providing gamma correction. However, the circuits that have been proposed do not provide full satisfaction, either because they are excessively complex and expensive, or else because they turn out to be unsuitable for operation with the television of the future, i.e. with definition that is higher than present practice.

SUMMARY OF THE INVENTION

An object of the invention is to provide a solution to this problem, and in particular to provide a gamma corrector which operates on high-performance analog signals, i.e. including signals for high-definition television, and which is capable of doing so under conditions of reasonable complexity and cost.

Another object of the invention is to provide a circuit capable of processing both gamma values that are greater than 1 and gamma values that are less than 1.

Another object of the invention is to provide a gamma corrector which is programmable either continuously or stepwise, over a range of values from about 0.2 to about 5, while conserving excellent performance.

The present invention provides a circuit of the type comprising:

a video signal analog input;

logarithmic amplifier means as a function of the desired gamma correction; and exponential amplifier means for providing the corrected signal.

According to the invention, the circuit is constituted in a special manner so that it includes:

a video path connected to the video signal input and including a wideband logarithmic amplifier;

a second input receiving a reference DC voltage;

a reference path connected to said second input and comprising a wideband logarithmic amplifier having the same characteristics as the logarithmic amplifier in the video path;

a weighted analog summing circuit for summing the outputs from the two paths with a gain of gamma for the video path and with a gain of one minus gamma for the reference path; and a wideband exponential amplifier whose output provides the gamma corrected signal.

Most advantageously, the wideband exponential amplifier and both of the wideband logarithmic amplifiers have the same characteristic constants K and VO.

In an advantageous embodiment, the exponential amplifier and both wideband logarithmic amplifiers are made using UHF transistors that are thermally coupled together and each of which is associated with an operational amplifier. For better performance, the UHF transistors could be replaced by SHF transistors.

According to any important feature of the invention, the gains of the weighted analog summing circuit are adjustable jointly to adjust the gamma coefficient.

By using switching, the weighted analog summing circuit may be changed simply from a value of gamma lower than 1 to a value of gamma greater than 1.

Overall, control can then be adjusted for gamma values lying in the range about 0.2 to about 5.

BRIEF DESCRIPTION OF THE DRAWING

An embodiment of the invention is described by way of example with reference to the accompanying drawing, in which the sole figure is a detailed circuit diagram of one embodiment of the circuit of the invention.

The drawing includes essentially items that are definitive in nature. It therefore constitutes an integral portion of the description and may serve not only to facilitate better understanding of the description, but also to define the invention, where necessary.

DETAILED DESCRIPTION

An analog video signal is applied to an input VS across the terminals of a load resistor 10. This signal is applied to an input buffer stage T11 constituted by an operational amplifier 110 and a feedback resistor 111. The output therefrom is applied to a first logarithmic amplifier AL12 constituted by an input resistor 121 connected to the inverting input of an operational amplifier 120 whose output is applied to a resistor 124 and is then looped via the emitter-collector link of a transistor 122 back to the inverting input. The base of transistor 122 is grounded. The non-inverting input of amplifier 120 is connected to ground via a resistor 123.

This circuit confers logarithmic characteristics to the amplifier 120 because of the response curve of the transistor 122 when connected in this manner.

The output from stage AL12 is applied to another buffer T13 constituted like the preceding buffer by an operational amplifier 130 and a feedback resistor 131.

The assembly T11, and T13 constitutes a first path or video signal path V1.

At the bottom of the figure, a positive reference voltage V+ is applied to two series resistors 201 and 202, with the resistor 202 being constituted by a potentiometer and with the pair of resistors constituting a continuously adjustable voltage source VR which is filtered by a capacitor 203.

The voltage VR is applied to the non-inverting input of an amplifier 210 provided with a feedback resistor 211 and constituting a buffer T21 similar to the buffer T11. Thereafter there is an amplifier AL22 set up exactly like the amplifier AL12 (with the reference numerals of identical components merely having 100 added thereto). Thereafter, there is another buffer T23 which is similar to the buffer T13. This assembly constitutes a reference path V2.

The outputs from the buffers T13 and T23 are applied to a weighted analog summing circuit S30 which is now described.

The inputs to this summing circuit S30 are constituted by the two outputs from the buffers T13 and T23. The summing circuit S30 is itself constructed around an operational amplifier 310, and thus comprises a circuit for the inverting input thereof and a circuit for the non-inverting input thereof. Switching is advantageously provided by means of coupled-together contacts 301 and 303.

In the position shown, it is assumed that a gamma of less than 1 is being processed.

The two inputs are respectively connected to adjustable resistors RA and RB, with the midpoint between them being connected via contact 301 to the non-inverting input of amplifier 310. The other input of the amplifier is merely connected to a fixed negative feedback resistor R.

Under these conditions, the gamma coefficient is equal to RB/(RA+RB).

The person skilled in the art will understand that this provides a gain of gamma for signals from the path V1 and a gain of one minus gamma from signals from the path V2.

When it is desired to process values of gamma that are greater than 1, then the contacts 301 and 303 are switched over to their other positions. In this case, the output from path V1 is directly connected to the non-inverting input of the amplifier 310.

The output from the path V2 is connected to a series connection of adjustable resistor RB and fixed resistor R with the midpoint therebetween being applied to the inverting input of the amplifier. The resistor RA is unused.

In this case the value of gamma is 1+R/RB.

Thus in this case also, the path V1 has a gain of gamma while the path V2 has a gain of one minus gamma.

The output from the summing circuit S30 is applied to an exponential amplifier AE32. This amplifier begins with a transistor 322 connected like the transistors 122 and 222, but in series upstream from the inverting input of the amplifier 320. The amplifier is provided with a negative feedback resistor 324 and with a resistor 325 connected to its non-inverting input.

This circuit provides exactly the opposite effect to the effect provided by the logarithmic amplifiers in which the transistor is mounted in the feedback loop. By connecting the transistor upstream from one of the inputs, the inverse function is performed directly, i.e. the corresponding exponential function is performed directly, providing that the accompanying resistors are designed to have appropriate resistances.

The output from the stage AE32 is applied to an output buffer T33 provided with two resistors 332 and 331 which fix the gain thereof by negative feedback, and with an output resistor 333.

Reference is now made to the equations given in the appendix.

Equations (I) give the signals V1 and V2 on the two input paths, respectively for the video signal VS and for the reference voltage VR.

Equation (II) gives the response V4 of the exponential amplifier to an input signal V3.

Equations (III) and (IV) recall the expressions for gamma and for (one minus gamma) when gamma is respectively less than and greater than 1.

The person skilled in the art will understand that in both cases an output signal is obtained having the form defined by equation (V).

All of the operational amplifiers may be of the same type CLC400 as manufactured by Comlinear.

The transistors 122, 222, and 322 may be constituted, for example, by three of the five transistors in a CA3127 type integrated circuit module as manufactured by RTC (La Radiotechnique).

In theory, the resistances of resistors 10 and 333 are 75 ohms, but any other resistances may be used to match conventional load impedances.

All the other resistances are 270 ohms except for the resistances of resistors 123, 223, and 325, which are 470 ohms.

The resistors RA, RB, and the amplifier 310 may be hardwired in a desired configuration, or optionally they may be interconnected by means of a high performance double-pole, double-throw switch.

The total resistance of each of the resistors RA and RB is about 270 ohms. They are adjustable as potentiometers, or merely by switching stepwise over tapped resistors.

Tests performed on the above-described circuit for values of gamma equal to 0.46 and 2.1 have shown that a stable passband can be obtained up to 60 MHz (with level differences of less than 1 dB).

The circuit turns out to possess delay characteristics which are entirely satisfactory and to possess excellent temperature stability, in particular over the temperature range that is normal in television apparatus, i.e. 10° C. to 60° C.

The correction performed by the invention may be expressed as the product of the reference voltage VR raised to the power (one minus gamma) and multiplied by the analog signal VS raised to the power gamma.

In practice, experiments show that it is desirable to add in an offset term which is responsive to various different parameters, and in particular to temperature.

Better accuracy is then obtained on the value of gamma for television apparatuses.

Naturally, the circuit of the invention is not limited to the embodiment described.

In particular, a plurality of transistors may be used for implementing the linear and the logarithmic amplifiers.

It is important to use transistors that have a high degree of thermal coupling and as little electrical coupling as possible while simultaneously having a high transition frequency.

The circuit of the invention may advantageously be embodied as an integrated circuit having outputs for hard-wiring or for connection to the switches 301 and 303. This makes it possible to obtain the same performance for values of gamma that are greater than one and for values that are less than one, which corresponds to providing circuits that are complementary: e.g. correction in the camera and correction in the display.

In addition, the invention defines a wideband analog non-linear corrector that may possibly have applications other than gamma correction for television, providing the corrections require a power function to be used.

| APPENDIX - EQUATIONS | |
|---|---|
| (I) | $V1 = -K \log (VS/VO)$ |
| | $V2 = -K \log (VR/VO)$ |
| (II) | $V4 = VO \exp (-V3/K)$ |
| (III) | $\gamma > 1$ |
| | $\gamma = (RB + R)/RB$ |
| | $1 - \gamma = -R/RB$ |
| (IV) | $\gamma < 1$ |
| | $\gamma = RB/(RA + RB)$ |
| | $1 - \gamma = RA/(RA + RB)$ |
| (V) | $VG = VR^{(1-\gamma)} \cdot VS^{\gamma}$ |

I claim:

1. A video signal gamma correction circuit comprising:

a video signal analog input;

a video path connected to the video signal input and including a wideband logarithmic amplifier and a video path output;

a second input receiving a reference DC voltage;

a reference path connected to said second input and comprising a wideband logarithmic amplifier having the same characteristics as the logarithmic amplifier in the video path, said reference path having a reference path output;

a weighted analog summing circuit for summing the outputs from the two paths with a gain of gamma for the video path and with a gain of one minus gamma for the reference path; and a wideband exponential amplifier, responsive to said summing circuit, whose output provides a gamma corrected signal, wherein the two wideband logarithmic amplifiers and the exponential amplifier are made using transistors that are thermally coupled together and each of which is associated with an operational amplifier.

2. A video signal gamma correction circuit comprising:

a video signal analog input;

a video path connected to the video signal input and including a wideband logarithmic amplifier and a video path output;

a second input receiving a reference DC voltage;

a reference path connected to said second input and comprising a wideband logarithmic amplifier having the same characteristics as the logarithmic amplifier in the video path, said reference path having a reference path output;

a weighted analog summing circuit for summing the outputs from the two paths with a gain of gamma for the video path and with a gain of one minus gamma for the reference path; and a wideband exponential amplifier, responsive to said summing circuit, whose output provides a gamma corrected signal, wherein the weighted analog summing circuit includes switching means for switching between values of gamma that are less than 1 and values of gamma that are greater than 1.

3. A video signal gamma correction circuit, comprising:

a first input for receiving a video analog signal;

a second input for receiving a reference DC voltage;

a video path connected to said first input and including a first wideband logarithmic amplifier, having selected characteristic constants of logarithmic amplification, said video path having a video path output;

a reference path connected to said second input and comprising a second wideband logarithmic amplifier, having the selected characteristic constants of logarithmic amplification as said first logarithmic amplifier, said reference path having a reference path output;

a weighted analog summing circuit, arranged for summing the video path output, with a first weighting gain of gamma applied thereto, and the reference path output, with a second weighting gain of one minus gamma applied thereto; and an output path, having an input connected to the output of said weighted analog summing circuit, and comprising a wideband exponential amplifier, the output of said output path providing a gamma corrected video signal.

4. A circuit according to claim 3, wherein said wideband exponential amplifier has the same characteristic constants as both said wideband logarithmic amplifiers.

5. A circuit according to claim 3, wherein both said wideband logarithmic amplifiers and said exponential amplifier are made using transistors having a high transistion frequency that are thermally coupled together, and each of which is associated with an operational amplifier.

6. A circuit according to claim 5, wherein said transistors having a high transition frequency that are thermally coupled together are the same model of transistor.

7. A circuit according to claim 3 wherein each of said video path and reference path further has at least one linear operational amplifier.

8. A circuit according to claim 3 wherein said output path further has a linear operational amplifier.

9. A circuit according to claim 3 wherein said weighted analog summing circuit comprises an operational amplifier having a feedback resistor between an output and an inverting input, first means for connecting a non-inverting input to the output of said video path, and second means including an adjustable resistor for connecting said inverting input to the output of said reference path, whereby said first and second weighting gains are commonly adjustable for gamma values greater than 1.

10. A circuit according to claim 3 wherein said weighted analog summing circuit comprises an operational amplifier having a feedback resistor between its output and an inverting input, first means including an adjustable resistor for connecting a non-inverting input to the output of said video path, and second means including an adjustable resistor for connecting said non-inverting input to the output of said reference path, whereby said first and second weighting gains are commonly adjustable for gamma values lower than 1.

11. A circuit according to claim 3 wherein said weighted analog summing circuit comprises:

an operational amplifier having an output, a non-inverting input, an inverting input, and a feedback resistor between said output and said inverting input, first coupling means including a first adjustable resistor in parallel with a first switch having a first position for coupling said non-inverting input to the output of said video path and a second position for coupling said non-inverting input to the output of said video path via said first adjustable resistor, and second coupling means including a second adjustable resistor having one end connected to said output of said reference path, and its other end connected in series with a second switch, having a first position for coupling said other end of said second adjustable resistor to said inverting input, and a second position for coupling said other end of said second adjustable resistor to said non-inverting input, said first and second switch being commonly controlled, whereby said first and second weighting gains are commonly adjustable for gamma values both higher than 1 and lower than 1, subject to said first and second switches being in their respective first and second positions.

12. A circuit according to claim 3 wherein said reference DC voltage is adjustable.

* * * * *